United States Patent [19]
Lai-Chau

[11] Patent Number: 5,548,465
[45] Date of Patent: Aug. 20, 1996

[54] LEAKAGE VOLTAGE INDUCTOR

[76] Inventor: Lin Lai-Chau, No. 53, Lane 211, Chung Shing Rd., Long Teng Shiang, Taoyuan, Taiwan

[21] Appl. No.: 142,206

[22] Filed: Oct. 25, 1993

[51] Int. Cl.⁶ ................................................. H02H 3/16
[52] U.S. Cl. ................................................ 361/44; 361/48
[58] Field of Search .............................. 361/42, 44, 47, 361/48, 187; 340/650

[56] References Cited

U.S. PATENT DOCUMENTS 4,525,764  6/1985  Titus ........................................... 361/48
4,899,246  2/1990  Tripodi ........................................ 361/48

Primary Examiner—Todd DeBoer
Attorney, Agent, or Firm—W. Wayne Liauh

[57] ABSTRACT

A leakage voltage inductor serves as an electrical safety protection device used to send an instant alarm or to cut off the power when a leakage is detected in an electric appliance, the device being used to send the alarm and to cut off the power automatically whenever a potential difference of more than 6V is detected between the housing of the appliance and the ground on which a person stands, for electrical safety protection purpose.

7 Claims, 3 Drawing Sheets

LEAKAGE VOLTAGE INDUCTOR

The present invention relates to leakage voltage inductors and, in particular, to an electrical safety protection device used to detect the leakage in electric equipments and which controls to send an alarm or to cut off the power automatically whenever a potential difference of more than 6V is detected between the housing of the appliance and the ground on which a person stands.

The phenomena that an object not in contact with an electric source may become charged are found in the following conditions:

(a) False leakage: Using a high resistance meter to measure a well insulated motor, voltage may be detected between the housing of the motor and the ground when the motor is turned on. But once a ground wire is connected, the voltage will disappear and there is no current detected in the ground wire when measured by a hook meter. For such false leakage, grounding by way of a ground wire is mistaken for the most effective and safest way of grounding in case of the leakage.

(b) Wind friction generated electricity: Power transmission lines extend in length of many kilometers. During power off, very high voltage still exists with respect to the ground if it is not grounded, which may be related to the relative loop induction of the tower. Therefore, in case of the power off operation, a wire must be connected to each tower.

(c) True leakage: True leakage refers to electricity passed to the conductive housing of an electric appliance due to damaged insulating cover of the conductor, moisture, electrolyte wetting and attachment of metal powder. There are the following on-site situations: 1. some machines are provided with a rubber cushion pad; 2. some are not grounded; 3. some are grounded but have been broken due to machine vibration; 4. an electric heater is grounded but the ground and all the human body are both wetted; and 5. some are well grounded having specified resistance of below 100, 50 and 10 ohms. In the optimal cases of 4 and 5, the leakage current is given as follows:

$$
\begin{aligned}
\text{current } (I) &= 220 \text{ V}/100 \text{ ohms} = 2.2 \text{ amperes (A)} \\
&= 220 \text{ V}/50 \text{ ohms} = 4.4 \text{ amperes (A)} \\
&= 220 \text{ V}/10 \text{ ohms} = 22 \text{ amperes (A)} \\
&= 110 \text{ V}/100 \text{ ohms} = 1.1 \text{ amperes (A)} \\
&= 110 \text{ V}/50 \text{ ohms} = 2.2 \text{ amperes (A)} \\
&= 110 \text{ V}/1 \text{ ohms} = 1.1 \text{ amperes (A)}
\end{aligned}
$$

Now, in case there is no leakage breaker in the major circuit of the negative feedback (NFB) or solenoid switch, assuming that there is leakage in an electric heater or other appliances, this equals to that the body is in parallel with a resistor of 100, 50, 10 ohms. Then it is safe for the body to touch the power source.

When a power supply of single phase 220V is connected to the copper tubing of a heater via a 2 PNFB and grounded, the ground wire is measured by the hook meter to have about 6 amperes of current. At 110 V, the resistance is about 18.3 ohms (that is, the sum of the ground resistances of the heater ground wire and of the local power company transformer), and again, the copper tubing and the bathroom ground are measured to have 110 VAC. If a bulb is connected between the copper tubing and the ground, it will be lit up. The ground wire turns to be the "ground wire of assurance".

Conventional leakage breakers operate according to the principle that the vector sums of the leakage current does not equal zero, and electronic circuit amplification is used to drive an electro-magnet, causing the leakage breaker to break apart. Assuming that there is no rubber cushion pad under the machine or the ground wire is not installed or damaged, the breaker will certainly not break apart, thus causing the entire machine to carray current.

With the present metal factory buildings, continuous production line, and the continuously connected hollow metal pipes, leakage breakers are render useless even they are in good conditions. Moreover, referring to FIGS. 3 and 4, assuming that the insulation for the conductor of the motor is damaged, leakage voltage (or leakage current) will pass to the ground through the housing 32, the ground wire 33, and then the grounding resistor 34. It is generally mistaken that leakage current flows to the ground without harming a person 38. If this is to be correct, the person 38 stands at the potential line 35 at the upper end of the grounding resistor, that is, the person 38 is at the same potential as the ground wire 33, nevertheless it has been frequently reported that persons 38 were harmed by leaked power.

By connecting power supply directly to the ground wire 33, due to that the ground wire 33 is connected to the housing 32 of the electric appliance 31 and the ground rod, this simulates the case where the insulation for the conductor is damaged. A voltage of zero Volt was detected between the housing 32 of the appliance 31 and the ground rod by a voltmeter 30, and then a voltage equal to the voltage of the power source respect to the ground was detected between the housing 32 of the appliance 31 and the ground on which the person 38 stands. This illustrates that the ground on which the person 38 stands is at the potential line 36 at the lower end of the grounding resistor instead of at the potential line 35 at upper end of the grounding resistor. In other words, in case of a leakage in the appliance 31, it is like the person 38 touching the power source with a resistor of 100, 50, or 10 ohms in parallel, thus resulting in injuries and deaths due to electrical shock caused by the current leakage because of lack of thorough understanding by the professionals.

Therefore, it is the primary object of the present invention to overcome the disadvantage that according to the principle in which the vector sums of the leakage current does not equal zero, and electronic circuit amplification is used to drive an electromagnet, causing the leakage breaker to break apart such that in case there is no rubber cushion pad under the machine or the ground wire is not installed or damaged, or there is leakage in other appliances coupled with the production line, the breaker will not break apart, thus causing the entire machine to carray current.

A secondary object of the present invention is to detect the occurrence of leakage between the housing of an electric appliance and the ground on which a person stands and to send an instant alarm or to cut off the power for electric safety protection purpose by changing the ground wire approach which has been mistaken for the most effective and safest way of grounding in case of leakage.

To achieve the above objects, the present invention serves as an electrical safety protection device used to send an instant alarm or to cut off the power when a leakage is detected in an electric appliance, said device being used to send the alarm and to cut off the power automatically whenever a potential difference of more than 6 V is detected between the housing of the appliance and the ground on which a person stands, for electrical safety protection purpose.

The present invention will be described in detail by way of embodiments in conjunction with the accompanying drawings, in which.

Figure 1:
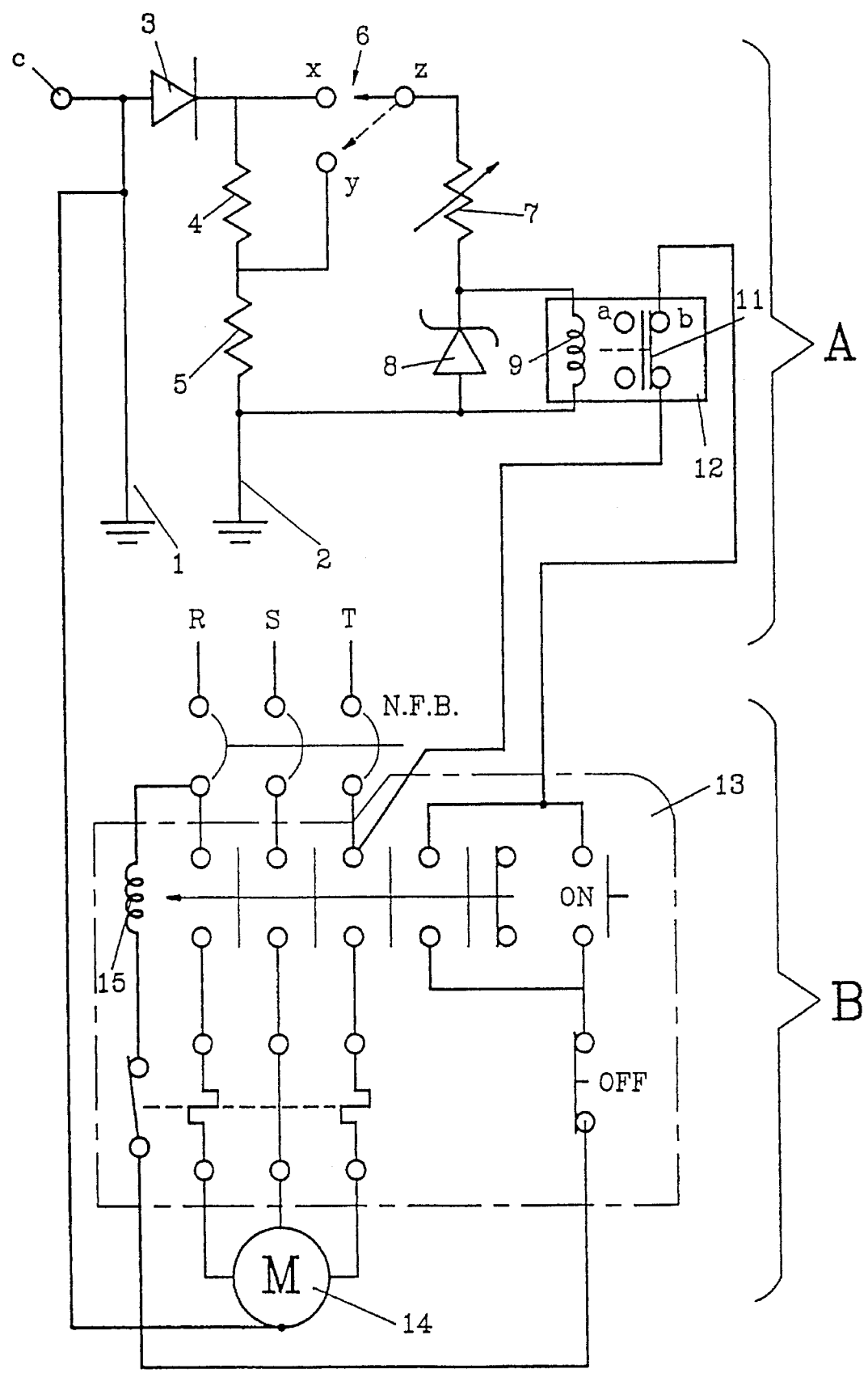
FIG. 1 shows an embodiment of wiring scheme of the present invention with an electric appliance.

Referring to FIG. 1, there is shown the detailed circuit of the present invention comprising an input end C connected to the positive pole of a diode 3, the negative pole thereof being connected to the connecting point X of a switch 6 and one end of a resistor 4, the other end of the resistor 4 being connected in series to a resistor 5. The other end of the resistor 5 is grounded, the serial connection between the resistors 4 and 5 being connected to the connecting point Y of the switch 6, and the connecting point Z of the switch being connected to a variable resistor 7 and connected in series to a Zener diode 8 to be ground.

Referring to FIG. 1, the portion A in FIG. 1 is the circuit diagram of the leakage voltage inductor of the present invention, and the portion B in FIG. 1 is the wiring diagram from the solenoid switch to the motor, the structure and the function thereof will be described hereinafter:

When a leakage occurs in the ground wire 1 of the housing of a motor 14 (the electric appliance), due to potential gradient, when it gets farther away from the ground rod, the voltage to ground wire (rod) gradually becomes higher to be above than the voltage of the power source with respect to the ground with a spacing of only tenths to one meter.

When there is a leakage in the appliance, the housing of the motor 14 has a voltage to the ground, which voltage being half-wave rectified by the diode 3 (when the voltage of the operating power supply to the ground is 110 V); and the switch 6 being switched to the position X. The rectified voltage drops to 55 VDC, which is divided by a variable resistor 7 and the coil 9 of a relay 12. When the variable resistor 7 is adjusted, the coil 9 operates as the voltage rises to 6 VDC to switch off the connecting point 11b of the relay 12; and at the same time, the coil 15 of the solenoid switch 13 is deactivated. By adjusting the variable resistor 7, the coil 9 of the relay 12 can be adjusted to a mating voltage. The voltage to activate the leakage voltage inductor of the present invention is set to be higher than 6V, the distance from the point where the second ground wire 2 is installed on the leakage voltage inductor A to the first ground wire 1 is determined by connecting the first ground wire to the power source with a wire and then the voltage between the ground where the second ground rod is to be installed and the first ground rod being measured to equal the voltage of the power source with respect to the ground where the second ground wire 2 and the ground rod may be installed.

When the voltage of the operating power source with respect to the ground is 220 V, the the switch 6 is switched to the position Y, the direct current after half-wave rectification by the diode 3 being divided by the resistors 4 and 5, then the same above result can be obtained.

A Zener diode 8 is used to protect the coil 9 by limiting the voltage to 6 V to prevent the coil from being burnt out due to excessively high voltage.

Figure 2:
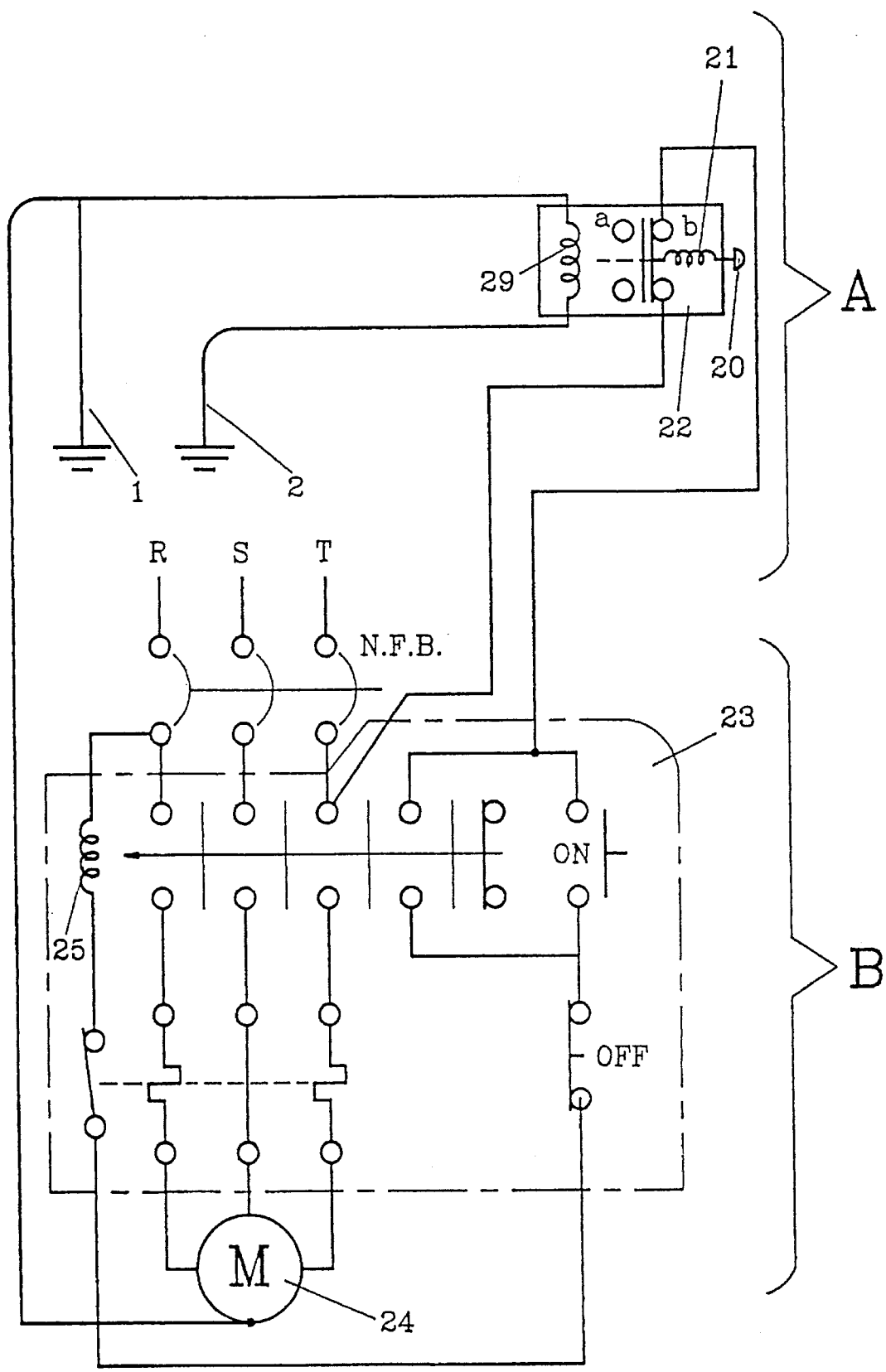
FIG. 2 shows another embodiment of wiring scheme of the present invention with an electric appliance.

Referring to FIG. 2, there is shown another embodiment of wiring scheme of the present invention with an electric appliance. As shown in the drawing, between the housing of the motor 24 provided with the circuit B and the ground, the portion A represents the leakage inductior 22 of the present invention comprising the coil of an electro-magnet 29 which is made to withstand the voltage of the operating power source to the ground, the ends of which are each connected to the first and second ground wires 1 and 2, respectively. The contact points a and b in the leakage voltage inductor 22 can be set to have an actuating voltage at a potential of higher than 6 V by adjusting the strength of the tension force of a spring 21, causing the contact point b (the switch contact) to break apart, thus to cut off the power supply to the coil 25 of the solenoid 23 in the portion B of the drawing. The strength of the tension force of the leakage voltage inductor is adjusted as desired and secured by a screw 20 and the strength of the spring 21 is designed not to exceed the limit of elasticity. The ends of said contact point b (the switch contact) are connected, respectively, to the T phase of the power source and the contact point above the "on" of the solenoid switch 23. When a leakage occurs in the motor 24, the leakage voltage is transmitted immediately through the first and second ground wires 1 and 2, causing the electro-magnet 29 to produce magnet lines of force and hence the contact point b (the switch contact) to break apart, thus cutting off the power to the circuit B.

Figure 3:
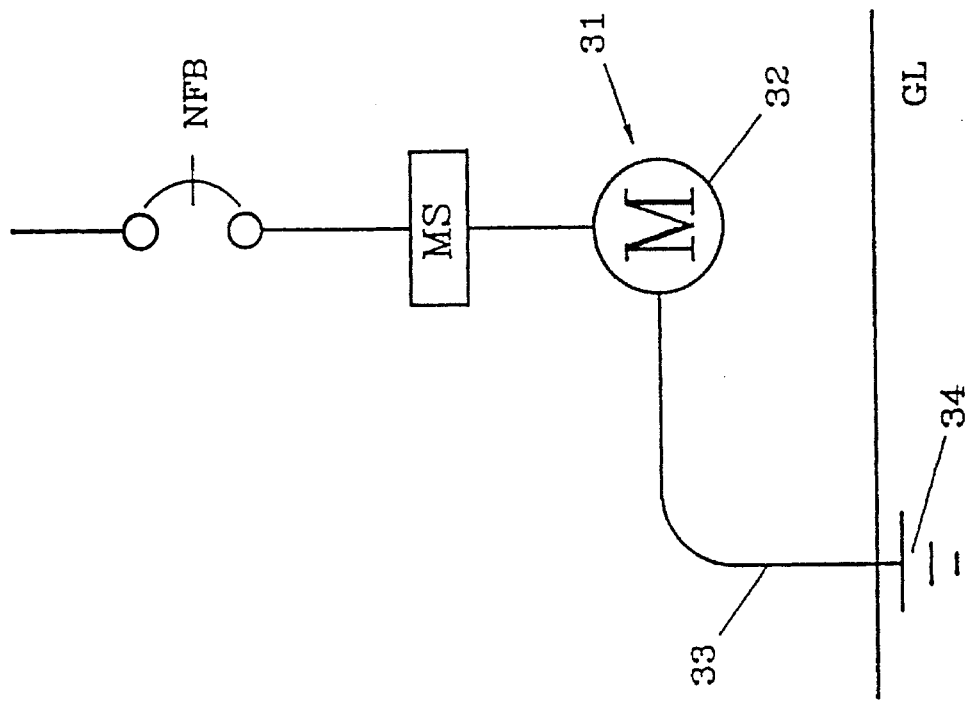
FIG. 3 is a diagram showing a conventional on-site wiring scheme.
Figure 4:
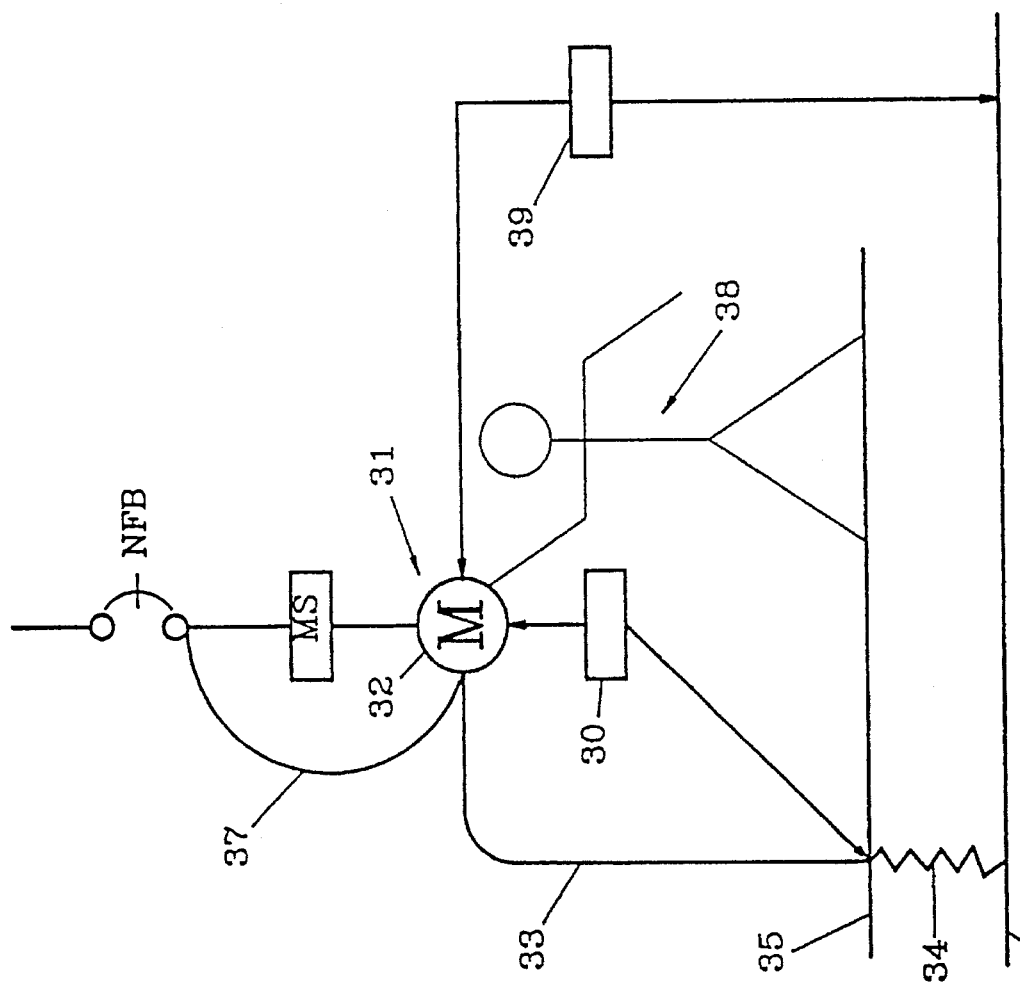
FIG. 4 is a schematic diagram showing the theory and experiment of FIG. 3.

With further reference to FIGS. 1, 2 and 3, the second ground wire 2 is arranged by connecting the first ground wire 1 to the power source by means of a wire, and the voltage of the first ground wire (rod) 1 with respect to the ground is measured to equal the voltage of the power source with respect to the ground, the second ground wire (rod) 2 being installed at a position near said ground.

In the foregoing, although the present invention has been described by way of embodiments, it is to be understood that various changes and modifications as well as other embodiment can be made by those skilled in the art without departing from the scope and spirit of the present invention. Therefore, the present invention is intended to cover all such changes, modifications and embodiments falling within the scope as defined in the appended claims.

I claim:

1. A leakage voltage inductor with a circuit structure comprising an input end C connected to the positive pole of a diode, the negative pole thereof being connected to the connecting point X of a switch and one end of a resistor 4, the other end of the resistor 4 being connected in series to a resistor 5, the other end of the resistor 5 being grounded, the serial connection between the resistors 4 and 5 being connected to the connecting point Y of the switch, the connecting point Z of the switch being connected to a variable resistor and connected in series to a Zener diode to be grounded, said Zener diode being in parallel with the coil of an electric appliance; characterized in that:

in said circuit structure, a voltage being detected on the housing of the leaking appliance with respect to the ground in the wiring circuit from the solenoid switch to the motor, said voltage being half-wave rectified by said diode with the switch being switched to the appropriate positions X, Y, the rectified voltage being lowered and divided by said variable resistor and the coil of a relay, such that when the variable resistor is adjusted, the coil operates as the voltage rises appropriately to switch off the connecting point b of the relay and the coil of the solenoid switch being deactivated at the same time, such that by adjusting the variable resistor, the coil of the relay can be adjusted to a mating voltage so as to set the actuating voltage within an appropriate range.

2. The leakage voltage inductor as set forth in claim 1 wherein said leakage voltage inductior may also consists of the coil of an electro-magnet, contact points a and b and an adjustable spring, the ends of said coilbeing each connected to the first and second ground wires, respectively, and wherein the ends of said contact point b (the switch contact) are connected, respectively, to the power source of the electric appliance and the contact point above the "on" of the solenoid switch.

3. The leakage voltage inductor as set forth in claim 1 wherein the second ground wire of said leakage voltage inductor is installed as determined by connecting the first ground wire (rod) to the power source by means of a wire, and the voltage of the first ground wire (rod) with respect to the ground being measured to equal the voltage of the power source with respect to the ground, the second ground wire (rod) 2 being installed at a position near said ground.

4. The leakage voltage inductor as set forth in claim 1 wherein the actuating voltage of the leakage voltage inductor is set to be over 6 V.

5. The leakage voltage inductor as set forth in claim 2 wherein said contact point b (switch contact) in said leakage voltage inductor may be caused to break apart at a potential of over 6 V by adjusting the strength of the tension force of said spring.

6. The leakage voltage inductor as set forth in claim 1 wherein the voltage of the operating power source of said leakage voltage inductor can be selected by the switch to mate with an appropriate resistance so as to suit various operating voltages with respect to the ground.

7. The leakage voltage inductor as set forth in claim 2 wherein the coil of said electro-magnet may also be used as the main breaking apart component for said breaker.

* * * * *